June 6, 1961

B. TEBB ET AL 2,987,075

FLUID PRESSURE CONTROL VALVES

Filed July 28, 1958

Inventors
BERNARD TEBB
CLARENCE HERBERT PERRY 2,987,075
FLUID PRESSURE CONTROL VALVES
Bernard Tebb, Staddlestones Garth, Swanland, and Clarence Herbert Perry, Hull, England, assignors to Mastabar Mining Equipment Company Limited, Hull, Yorkshire, England, a British company
Filed July 28, 1958, Ser. No. 751,476
Claims priority, application Great Britain July 30, 1957
4 Claims. (Cl. 137—543.17)

This invention concerns fluid pressure control valves.

In many hydraulic apparatus, the operation of which is dependent upon the transfer of hydraulic fluid from a reservoir to a hydraulic pressure chamber, the latter is usually provided with an excess pressure relief valve, which conventionally may be a ball valve or a tappet valve spring loaded against a fixed seat so as to yield when a predetermined maximum pressure is reached. Such excess pressure relief valves, or yield valves, are almost invariably provided, for example, in telescopic hydraulic supports such as pit props and the like roof supports as used in mining operations to enable the prop to yield in response to roof movement, and to control such movement. In practice, to enable them to fit into the limited spaces available, these pressure control valves must be of compact design and of small dimensions relative to the remainder of the hydraulic equipment in which they are used, and the contact areas between the valve member and valve seat must be kept small and narrow, that is to say, ideally they should be line contacts, if an efficient yielding action is to be obtained and minimum variation of yield load slip is to result. By yield load slip is meant the effect experienced in a pressure control valve when the predetermined maximum pressure is attained and the valve lifts from its seat. Under these conditions there is an immediate fractional drop in pressure which, for example in the yield valves referred to above, results in shedding of the load, but unless this pressure release is restrained and kept within very narrow limits there is danger of the prop contracting too rapidly to give continued controlled support to the roof.

Thus, if a predetermined maximum load, or a load slightly in excess thereof, is maintained on the support, as may frequently happen in practice, the yield valve repeatedly operates to allow fractional adjustment of the pressure in the hydraulic pressure chamber to maintain that pressure substantially at its given maximum value, and hence there takes place, repeated impact of the valve member against the valve seat. Moreover, it will be appreciated that since the valve member is constantly spring-urged into closing position against its seat, the force with which the valve member contacts the seat is a maximum when there is no fluid pressure in the pressure chamber, i.e. when the support is not in operation, and a minimum at the instant that maximum fluid pressure is attained and the valve member is caused to lift. The specific stress exerted on the valve member and seat contact surfaces is therefore high, due to their restricted areas, and under prolonged use leads to deterioration of those surfaces, with the result that the valve ceases to function efficiently.

According to the present invention, a fluid pressure control valve includes a valve member resiliently urged into sealing relation with a valve seat presented by a movable member initially displaceable, under applied fluid pressure, in a direction opposed to the resilient seating force.

In a valve of this construction, therefore, the resilient seating force is a minimum when the applied fluid pressure is a minimum, and increases with increasing fluid pressure until the latter overcomes the seating force and lifts the valve member. This is in direct contrast to the conventional valve constructions hereinbefore described, and has the effect that, should the fluid pressure suddenly drop from a high value to a low value, the force with which the valve member re-seats is less than the seating force employed to control values of the fluid pressure of the order of and up to the predetermined maximum pressure. Moreover, since the valve seat is presented by a movable member which is displaced by the fluid pressure being controlled, that fluid pressure itself, as the valve repeatedly operates in the region of maximum fluid pressure, acts as a cushion to partially take up the impact of the valve member on the valve seat.

Preferably the displacement of the movable member is limited by stop means at a position where the said displacement has brought the resilient seating force exerted on the valve member to a value permitting the valve member to lift only at the desired maximum fluid pressure.

The valve proposed by the invention may conveniently be housed in an enlargement in a pressure relief duct leading from the pressure chamber.

The invention will be described further, by way of example, with reference to the accompanying drawings, in which.

Figure 1:
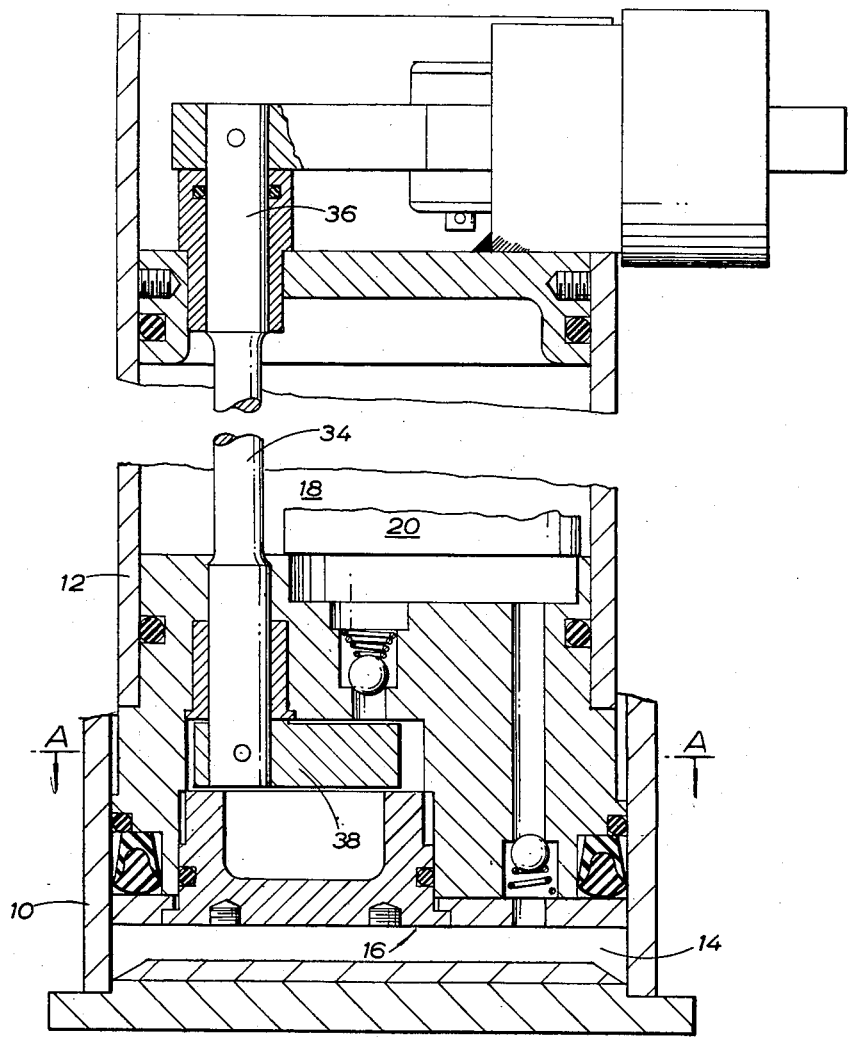
FIG. 1 is a longitudinal sectional elevation through a hydraulic pit prop incorporating a relief valve constructed in accordance with the invention.
Figure 2:
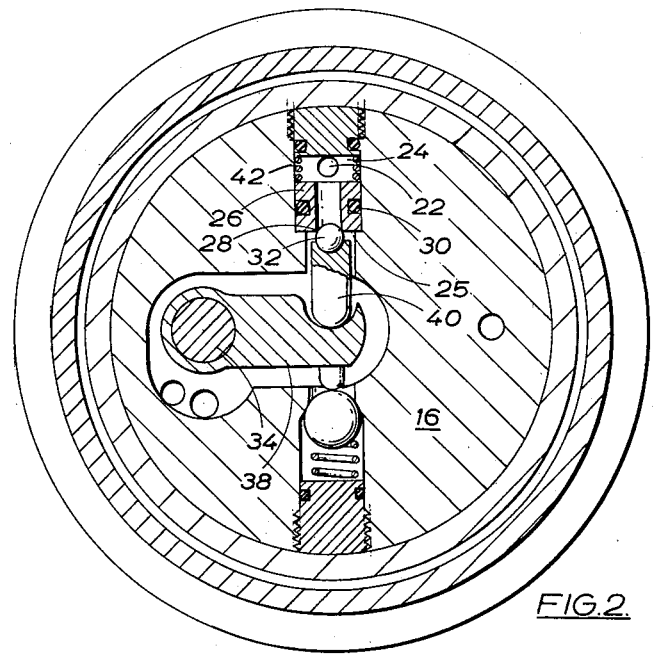
FIG. 2 is a horizontal section taken on the line A—A of FIG. 1.

In the embodiment of the invention shown in FIGS. 1 and 2 of the drawings, the valve constitutes an excess pressure relief valve incorporated in a hydraulic pit prop of the type having telescopically engaged members 10 and 12 of which the outer member 10 includes a pressure chamber 14 and the inner member 12 has its lower end formed as a hydraulic ram 16 disposed in the pressure chamber 14, the space in the member 12 above the ram 16 constituting a reservoir 18 for hydraulic fluid. Pump means indicated diagrammatically at 20 are provided to enable the prop to be extended by pumping hydraulic fluid to the pressure chamber 14 from the reservoir 18. The hydraulic ram 16 is formed with a fluid pressure relief duct 22 leading from the pressure chamber, and this duct opens into a chamber 24 of enlarged cross-sectional area wherein is slidingly received an axially bored bush 26 which, at its end remote from the duct 22, is formed as a valve seat 28. The bush 26 carries an external fluid sealing ring 30 intermediates its ends to prevent leakage of high pressure fluid from the pressure chamber 14 past the outside of the bush; and a ball valve member 32 is spring urged against the seat 28 provided on the bush. The necessary spring force for seating the valve member 32 is provided by means of a torsion bar 34 received at one end in the ram head 16 and fixed at its other end 36 at a convenient point remote from the ram head, the first-mentioned end of the torsion bar having a short lever extension 38 bearing on the valve member 32 through a carrier rod 40.

The bush 26 within the chamber 24 is somewhat shorter than that chamber, and the spring force exerted by the torsion bar 34 is arranged to be just sufficient to adequately hold the valve member 32 seated when there is no fluid pressure in the pressure chamber 14, and to move the bush to the end of the chamber 24 nearest the pressure chamber 14. When hydraulic fluid under pressure is admitted to the pressure chamber, however, since the valve member 32 is seated, there first takes place an initial displacement of the bush 26 to the opposite end of the chamber 24, during which displacement the valve member 32, via the lever extension 38, is caused to bear with increasing force against the torsion bar 34, the arrangement being such that, when finally the bush 26 abuts against the end of the chamber 24 remote from the pressure chamber 14, the reaction of the torsion bar 34 against the valve member 32 constitutes the spring force permitting the valve member 32 then to lift only when the fluid pressure in the pressure chamber 14 attains its desired maximum value. When this maximum pressure value obtains, the valve member 32 lifts to relieve the pressure chamber 14, and the region of the chamber 24 beyond the enlarged diameter part thereof is formed to be capable of receiving the valve member 32 and its carrier 40, or a portion thereof, during the relief, lifting movement.

It will be appreciated that, by virtue of the valve construction described, since the spring seating force increases with fluid pressure up to a given maximum value at which the valve member 32 lifts, any subsequent drop in fluid pressure serving to allow the valve member to re-seat results in a re-seating force which is always less than that maximum value; and that the existence of fluid pressure behind the valve seat 28 serves as a cushion to at least partly absorb the impacts of valve closing operations.

If required, a light spring 42 may be interposed between the end of the bush and the end of the enlarged part of the relief duct nearest the pressure chamber in order to safeguard proper seating of the valve member 32 under conditions of no fluid pressure in the hydraulic pressure chamber 14.

Whilst satisfactory operation of the valve described is obtained by employing a valve member such as the ball 32 or a tappet, as already mentioned, the valve performance may be still further improved by causing the resilient seating force to be applied to the valve member at a region thereof which is behind the valve seat relative to the direction of fluid flow. In this way there is avoided any complication which might be introduced by precautions otherwise often necessary to confine the seating force strictly to the axial direction of the valve i.e. of the bush presenting the valve seat, and in the absence of which, compression of the valve spring can result in the force exerted thereby becoming directed somewhat off the axis. If, however, the re-seating force is applied behind the valve seat, there is then a tendency for that force to pull the valve member on to its seat, rather than to push it.

One convenient way of accomplishing this is to provide (FIG. 3) a valve member 50 of elongated cylindrical shape adapted to be received in the bore in a bush 52 presenting a valve seat 54, and having, at its end region co-operating with the valve seat, an outwardly conical external surface 51 abutting in fluid sealing relationship with the valve seat 54 in the closed condition of the valve. This cylindrical valve member 50 is itself axially bored at 56 to a depth such that the bore 56 terminates behind the valve seat 54 when the valve member 50 is in its closed position thereon, and within the said bore 56 is received one end region of a push rod 58, to the opposite end region of which is applied the resilient seating force. For this purpose, the said end region of the push rod 58 has an annular flange 60 serving as one abutment for a valve compression spring 62 of helical form. The force exerted by the spring 62 is thus applied to what may be termed the bottom end of the valve member 50, i.e. behind the valve seat 54 viewed in the direction of fluid flow, and tends to keep the valve member in accurate axial alignment. To still further encourage this tendency, the end of the push rod 58 received in the valve member may be tapered and pointed as shown, the end of the bore 56 within the valve member being correspondingly shaped so as to axially centre the push rod on engagement therewith.

Figure 3:
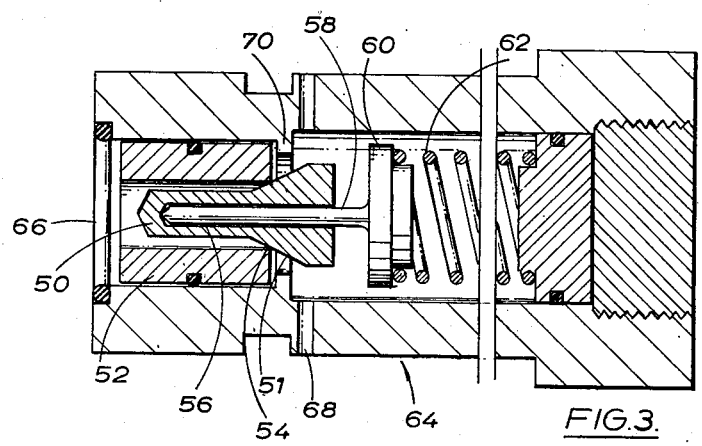
FIG. 3 is a longitudinal sectional elevation of another embodiment of relief valve.

It will be noted that, whereas in the embodiment of the invention described with reference to FIGS. 1 and 2, the valve has been shown as being integrally incorporated in a typical practical application, namely a pit prop, FIG. 3 shows how the valve may constitute an independent entity received within its own housing generally designated 64 and having inlet and outlet ports 66 and 68 respectively. A valve unit constructed as shown in FIG. 3, often known as a valve capsule, may conveniently be employed in any desired fluid pressure apparatus capable of having formed therein, a bore appropriate to receive the housing 64, as by threaded engagement between the two, and such valve units are especially advantageous where it is important that the relief valve may readily be serviced or replaced at relatively frequent intervals. Of course, it will be appreciated that the valve member 50 and push rod 58 of FIG. 3 may, with minor modifications, be substituted for the valve member 32 and carrier 40 of FIGS. 1 and 2, and vice versa. It will further be observed that in both cases, the chamber housing the displaceable bush is provided with stop means, which in FIG. 2 is a shoulder 25 formed between the two regions of different diameter of the chamber 24, and in FIG. 3 is an annular projection or shoulder 70, the said stop means serving to limit the rearward movement of the displaceable bush and to define a position where the said movement has brought the spring seating force to a value such that the valve member is able to lift only when subjected to the desired maximum fluid pressure.

We claim:

1. A fluid pressure control valve member arranged in a pressure relief passage of a fluid pressure chamber to open when the pressure in the chamber attains a predetermined maximum value, a movable member slidably positioned in fluid-tight relation in said passage for movement between a first end position adjoining the inlet end of said passage and a second end position remote from said inlet end, said movable member being axially bored and presenting one of its ends to the fluid pressure in said passage, a valve seat surrounding the other end of said bore, spring means having a first region secured stationarily relative to said chamber and a second region acting against said valve member, whereby said valve member is resiliently urged into sealing relation on said seat, and stop means in said passage downstream of said inlet end and defining said second end position, said movable member co-operating with said valve member for moving said spring means, responsive to the value of fluid pressure incident upon said movable member, between a first condition, corresponding to said first end position of said movable member, in which the resilient seating force exerted by said spring is sufficient only to adequately hold said valve member seated and a second condition, corresponding to said second end position of said movable member, in which said resilient seating force has a maximum value corresponding to the maximum permitted value of fluid pressure in said chamber and passage.

2. A fluid pressure control valve unit received in a pressure relief passage of a fluid pressure chamber to relieve pressure fluid from said chamber when the pressure therein attains a predetermined maximum value, said control valve unit comprising a housing bored to present a valve chamber having a pressure fluid inlet port and a pressure fluid outlet port and counterbored to present a further chamber adjoining said valve chamber at a position thereof remote from said inlet port, an inwardly directed shoulder at the junction between said chambers, an axially bored bush slidably positioned in said valve chamber for movement between a first end position adjoining the inlet port of said chamber and a second end position defined by said shoulder, said bush having one end of its axial bore communicating with said fluid inlet port, a valve seat surrounding the other end of said axial bore, a valve member closable on to said valve seat, and spring means in said further chamber and having a first region which is secured relative to said housing and a second region acting against said valve member for urging said valve member into closing relation on said seat, said bush co-operating with said valve member for moving said spring means, responsive to the fluid pressure incident upon said bush, between a first condition, corresponding to said first end position of said bush, in which the resilient seating force exerted by said spring is sufficient only to adequately hold said valve member seated, and a second condition, corresponding to said second end position of said bush, in which said resilient seating force has a maximum value corresponding to the maximum permitted value of fluid pressure in said pressure chamber.

3. A fluid pressure control valve as set forth in claim 2 in which said valve member is of elongated form comprising a forward portion freely engageable in the axial bore of said bush and a rear portion diverging outwardly from said forward portion to a diameter greater than that of said axial bore, said valve member being formed at its rearward end with a blind axial bore, and said rear portion of said valve member being adapted to close against said valve seat, and wherein said valve further comprises a spigot engaged in the blind bore of said valve member and extending outwardly therefrom to terminate in an annular flange, and said spring means is a helical spring extending between said annular flange of said spigot and said valve housing.

4. In fluid pressure operated apparatus of the type including a pressure chamber adapted to receive a working fluid under pressure, and a pressure relief valve arranged in a pressure relief passage of said pressure chamber for relieving fluid of predetermined maximum pressure from said chamber, the improvement wherein said pressure relief passage is formed with a valve chamber, and said pressure relief valve comprises an axially bored bush slidably received in fluid-tight relation in said valve chamber, said bush being capable of occupying a first end position in said valve chamber at the pressure fluid inlet end of said valve chamber and a second end position downstream of said inlet end, a valve seat surrounding the downstream end of the axial bore in said bush, a valve member closable on to said valve seat, spring means having a first region arranged stationarily relative to said valve chamber, and a second region operatively connected with said valve member to urge said valve member into closing relation on said seat and to displace said bush into said first end position, and stop means arranged at the downstream end of said valve chamber to define said second end position of said bush, said bush cooperating with said valve member for moving said spring means, responsive to the fluid pressure incident upon said bush, between a first condition, corresponding to said first end position of said bush, in which the resilient seating force exerted by said spring is sufficient only to adequately hold said valve member seated, and a second condition, corresponding to said second end position of said bush, in which said resilient seating force has a maximum value corresponding to the maximum permitted value of fluid pressure in said pressure chamber.

References Cited in the file of this patent
UNITED STATES PATENTS

| | | |
|---|---|---|
| 304,271 | Lunkenheimer | Aug. 26, 1884 |
| 1,480,155 | Darling | Jan. 8, 1924 |
| 1,569,143 | Robinson | Jan. 12, 1926 |
| 1,776,937 | Timbs | Sept. 30, 1930 |
| 1,812,577 | Albertine | June 30, 1931 |
| 2,198,447 | White | Apr. 23, 1940 |
| 2,523,192 | Brown | Sept. 19, 1950 |
| 2,895,504 | Lederer | July 21, 1959 |

FOREIGN PATENTS

| | | |
|---|---|---|
| 157,190 | Australia | June 23, 1954 |